Figure 1:
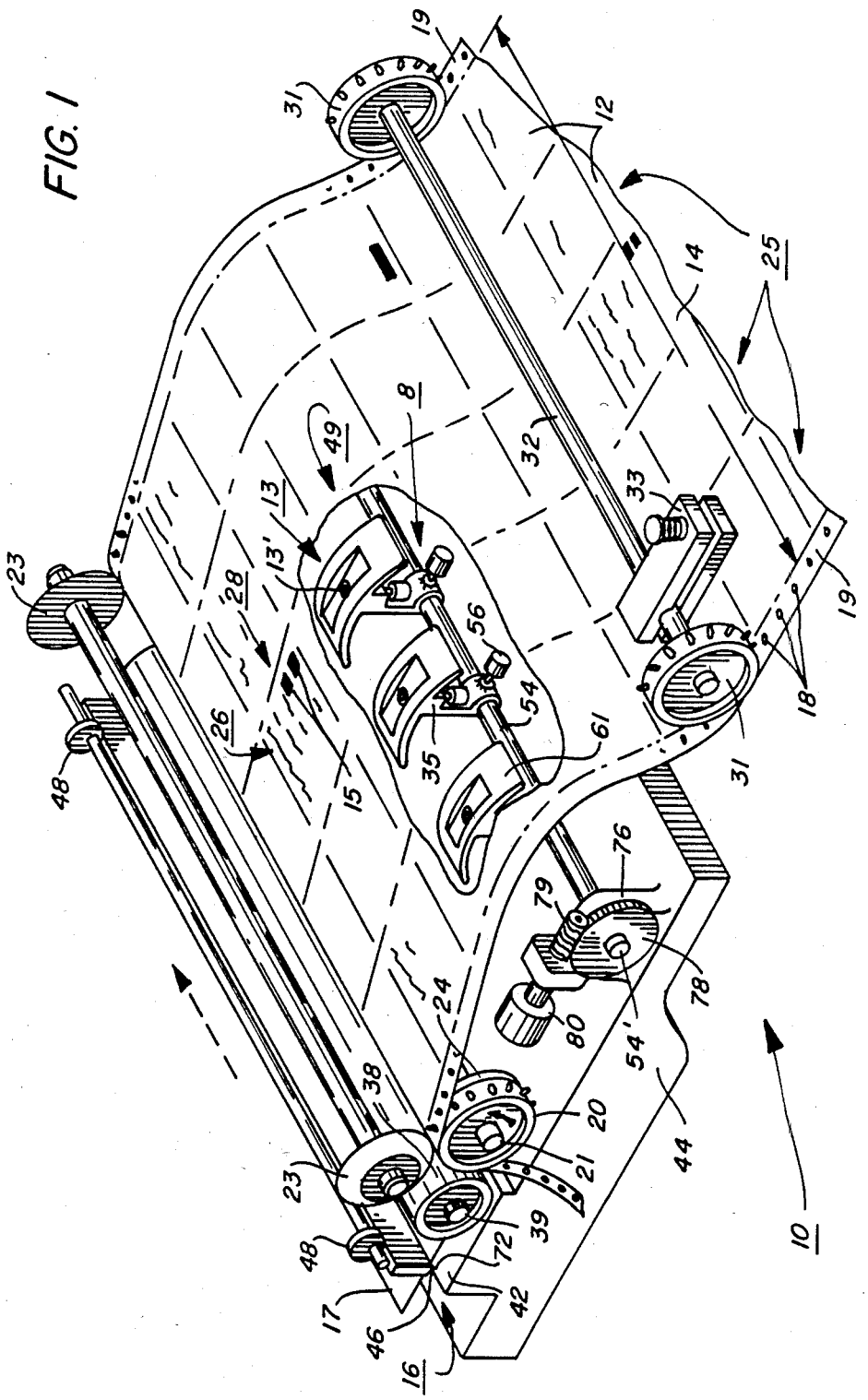

United States Patent [19]

Stock et al.

[11] Patent Number: 4,557,786

[45] Date of Patent: Dec. 10, 1985

[54] LABEL SCANNER ASSEMBLY FOR LABELLING MACHINES

[75] Inventors: Robert A. Stock, Crystal Lake; Robert A. Hayskar, Palatine, both of Ill.

[73] Assignee: Xerox Corporation, Stamford, Conn.

[21] Appl. No.: 615,006

[22] Filed: May 29, 1984

[51] Int. Cl.⁴ ............................................. G01N 21/48
[52] U.S. Cl. .................................. 156/350; 156/353; 156/378; 250/571
[58] Field of Search ............................... 156/361–364, 156/350–355, 378, 64; 250/571, 227, 239; 226/45, 20

[56] References Cited

U.S. PATENT DOCUMENTS

| | | | |
|---|---|---|---|
| 336,200 | 2/1886 | Beardslee | 74/426 |
| 3,315,083 | 4/1967 | Bushnell | 250/571 X |
| 3,646,325 | 2/1972 | George | 235/61.11 R |
| 3,820,900 | 6/1974 | Bauer | 356/200 |
| 3,919,561 | 11/1975 | Coberley | 250/571 X |
| 4,013,006 | 3/1977 | Burell et al. | 101/227 |
| 4,194,840 | 3/1980 | Lucas et al. | 356/429 |
| 4,267,004 | 5/1981 | Anderson | 156/361 |

*Primary Examiner*—David Simmons
*Attorney, Agent, or Firm*—Frederick E. McMullen

[57] ABSTRACT

A scanner assembly for scanning labels for the presence of control marks as the labels are being fed to the labelling head of a labelling machine, the scanner assembly including a cross shaft rotatably supported on the labelling head below the path of movement of the labels, at least one radially projecting support arm on the cross shaft, the support arm being keyed to the cross shaft for slideable movement axially along the cross shaft to enable the position of the support arm on the cross shaft to be adjusted laterally; the outer end of the support arm being enlarged to provide a surface for supporting and guiding the labels along the path of label movement; a recess of predetermined depth in the support arm surface; a label scanning sensor in the recess for scanning labels as the labels move across the support arm surface to the labelling head; and manually operated gear means for rotating the cross shaft and the supporting arm thereon to enable the point where the sensor scans the labels to be moved along a predetermined arcuate path parallel to the direction of label movement during adjustment.

7 Claims, 2 Drawing Figures

LABEL SCANNER ASSEMBLY FOR LABELLING MACHINES

This invention relates to a scanner assembly for scanning labels being fed to a labelling machine for control marks, and more particularly, to an improved adjustable scanner assembly.

In current day labelling machines, which function to apply, typically by adhesion or thermal transfer, labels bearing address information to items such as envelopes, the labels themselves may bear control marks or indicia. Such marks provide information or data for operating the labelling machine and any attachments thereto such as output conveyors, envelope sealers, and the like. Control information and data of the type alluded to may for example be used to signal the start or end of a Zip Code group, identify various labels as comprising addresses for a particular group of persons such as doctors, lawyers, and so forth. Such control information as well as the address information are normally provided by a computer with the computer printer employed to print the labels in columns on an endless label form or web from which the individual labels are later cut.

To find and decipher the control marks on the individual labels, one or more sensors are provided astride the path of movement of the label form. These sensors scan the labels prior to the labels being cut from the form. For this purpose, the sensor or sensors are supported by a scanner assembly, which is usually made adjustable to some degree at least to pemit the location of the sensor or sensors to be adjusted and assure that the control marks are detected.

Present day scanner assemblies however are often found to suffer from significant drawbacks. For example, to control the space, i.e. the "gap" between the scanning sensor or sensors and the label form, and assure that the labels are read and that the control marks are detected by the sensor or sensors requires that an operator adjustment mechanism be provided. This is due to the need to compensate for the varying heights of the label form which result when the sensor or sensors are adjusted laterally to accommodate a change in label type or size or for a different control mark pattern or position.

Another drawback is traceable to the mechanism typically employed to adjust for varying label widths, i.e. a "box" design in which the entire label feeding structure is supported on two parallel shafts having threaded ends to permit axial adjustment of the structure. This design requires that the entire label feeding structure be moved either towards or away from the labelling head when making adjustments. Not only is this design cumbersome and expensive, but any adjustment is awkward and time consuming. Further, it is believed that the feeding characteristics of the label feeding structure are adversely affected by this arrangement since there results a shift in the support location of the label form with respect to the labelling head when adjustments are performed.

The invention relates to an adjustable scanner assembly for supporting one or more sensors for scanning labels as the labels advance along a path to the labelling head of a labelling machine which assures that a preset gap between the labels and the sensor or sensors is maintained irrespective of any sensor positional adjustments and which provides improved support for the scanning sensor or sensors, comprising, in combination: a machine frame member; a cross shaft rotatably mounted on the frame member; at least one sensor support arm on the cross shaft, the sensor support arm projecting radially outward toward the path of movement of the labels and forming an exterior guide surface for guiding the labels along the label path; a sensor mounted adjacent the outer end of the support arm and in preset spaced relation to the label guide surface for scanning the labels as the labels advance along the label path; and means for rotating the cross shaft together with the support arm to move the point where the sensor scans the labels through a preset arc so that the point where the sensor scans the labels may be adjusted without changing the gap between the labels and the sensor.

IN THE DRAWINGS

Figure 2:
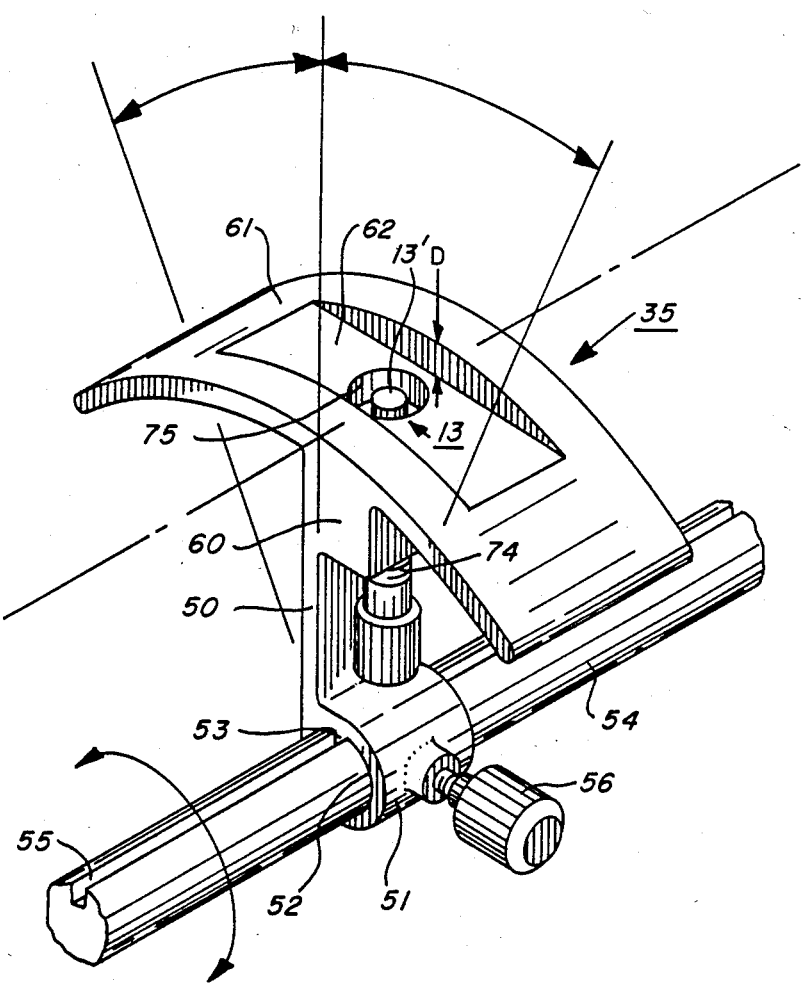

FIG. 1 is an isometric view schematically depicting a label transport of the type used with labelling machines incorporating the adjustable scanner assembly of the present invention; and FIG. 2 is an enlarged isometric view showing details of the sensor support for the adjustable scanner assembly shown in FIG. 1.

Referring to FIGS. 1 and 2 of the drawings, the adjustable scanner assembly of the present invention, designated generally by the numeral 8, is there shown. As will appear, scanner assembly 8 is used with a label transport, designated generally by the numeral 10, of the type adapted for feeding an endless form or web 14 of labels 12 from a label supply (not shown) to a guillotine 16 which cuts the label form 14 transversely into strips 17 as will appear. As label form 14 is fed forward by transport 10 to guillotine 16, the labels are scanned or read by one or more sensors 13 at scan station 49 for the presence of control information and data in the form of black box-like marks 15 on the individual labels.

As will be understood by those skilled in the labelling arts, label form 14 typically comprises an endless sheet similar to computer fanfold having a row of perforations 18 along each side margin 19 thereof. Label form 14 normally has plural rows 25 of labels 12. In the example shown and described herein, a five row or 5-up configuration is shown. However, it will be understood that the number of label rows 25 may vary from one to any desired multiple. Each label 12 is, for explantion purposes, divided into an address section 26 where the addressee's name, street, city and zip code are carried, and a control section 28 for control marks 15. Typically, the label information on label form 14 is generated by a computer with the labels 12 printed on form 14 by the computer printer.

Perforations 18 in the side margins 19 of label form 14 are drivingly engaged by pinwheels 20 of label transport 10. Pinwheels 20 are supported in predetermined axial spaced relation with one another on rotatable shaft 21, shaft 21 being driven in the direction indicated by the solid line arrow. A pair of upper and lower cutting discs 23,24 are provided adjacent to and slightly downstream of each pinwheel 20, discs 23,24 serving to slit form 14 longitudinally to remove the side margins 18 prior to cutting of the label form by guillotine 16.

A pair of sprocketted tension wheels 31 are provided for tensioning label form 14 as the form is being advanced. Tension wheels 31, which drivingly engage the perforations 18 in margins 19 of label form 14, are rotatably supported in predetermined axially spaced relation on cross shaft 32. Shaft 32 is frictionally engaged by a stationary brake shoe 33, shoe 33 serving to place a controlled frictional drag on label form 14 through tension wheels 31.

One or more sensor supports 35 are provided between tension wheels 31 and pinwheels 20, each support 35 supporting a sensor 13 for scanning labels 12 on form 14 at scan station 49. Pinwheels 20 and margin cutting discs 23,24 cooperate with a guide roll 38 rotatably journaled on cross shaft 39 to route the label form, following severing of the label form side margins 18 by discs 23,24 to guillotine 16.

Guillotine 16, the axis of which extends transversely to the direction of movement of label form 14, has a lower knife blade 42 supported on machine supporting platform or frame member 44 of the labelling machine. An upper knife blade 46 is supported for vertical reciprocating movement above lower knife blade 42, upper knife blade 46 moving in reciprocating fashion into and out of cutting relation with lower knife blade 42. A suitable knife driver, exemplified herein by cam 48, serves to reciprocate upper knife blade 46 in timed relation with the advance of label form 14 by transport 10. The operating length of knife blades 42, 46 of guillotine 16 is preferably slightly greater than the width W of the maximum size label form 14 to be processed.

Referring particularly to FIG. 2, sensor supports 35 each comprise an arm-like member 50 having an enlarged lower end 51 with a cross bore 52 therethrough. A locating keyway 53 is provided in bore 52. Bore 52 and keyway 53 are dimensioned to permit arm 50 to be mounted for axially slidable movement on a cross or mainshaft 54 having a longitudinal keyway recess 55 therein. As will be understood, keyway 53 and recess 55 interengage with one another to prevent turning or rotation of arm 50 and sensor support 35 relative to shaft 54. A locking bolt 56, which is designed for manual operation, is threaded through the lower end 51 of arm 50 to permit engagement thereof with shaft 54 on turning thereof to lock the sensor support 35 in selected axial position on shaft 54.

The upper end 60 of arm 50 of sensor support 35 is enlarged to provide a relatively large curved label form supporting surface 61. Preferably, the locus of the radius of curvature of surface 61 is coincident with the axis of shaft 54. A generally rectangular cutout or opening 62 of predetermined maximum depth D is provided in the central portion of surface 61 to accommodate sensor 13 and establish a predetermined optimum distance between the sensor 13 and label form 14. Sensor 13, which may for example comprise a photo cell type detector, is shown as being generally round, with exteriorly threaded section 74 cooperable with internally threaded axial bore 75 in arm 50 to mount sensor 13 on sensor support 35. In order to establish a common reference where multiple sensors are used and a predetermined dimensional relationship between the sensor or sensors 13 and the label form 14, each sensor 13 is preferably mounted in bore 75 in arm 50 so that the detecting surface 13' thereof is at the same level as the base of cutout 62.

Referring to FIG. 1, shaft 54 is rotatably supported in axially spaced arm-like extensions 76 of frame member 44. Shaft 54 is elongated so that one end 54' projects beyond the arm-like extensions 76 on one side, shaft end 54' having a worm gear 78 fixed thereon. A cooperating worm wheel 79, which is suitably journalled in the machine frame member, meshes with gear 78. A knob 80 is provided on one end of worm wheel 79 to permit wheel 79 to be turned or rotated manually, rotation of worm wheel 79 working through gear 78 to rotate mainshaft 54 and adjust the angular position of sensor support 35 as will appear.

In operation and referring to FIGS. 1 and 2, label form 14 is advanced by pinwheels 20 of label transport 10 from the label supply through scanning station 49 to guillotine 16. Guillotine 16, which is operated in timed relation by cam 48 to the fed of label form 14, cuts form 14 longitudinally in a direction perpendicular to the direction of form movement to provide label strips 17. In the example shown and described herein, label strips 17 comprise a strip of five labels 12. As will be understood by those familiar with the labelling arts, strips 17 are thereafter fed in a direction substantially perpendicular to the direction of fed of label form 14 (shown by the dotted line arrow in FIG. 1) to a second knife mechanism (not shown) which cuts the label strip into individual labels 12 for application or transfer to the item being labelled, typically envelopes.

As label form 14 passes through scanning station 49, the labels 12 are scanned by sensors 13 for the presence of control information and data. Since label form 14 has five rows 25 of labels 12, five sensors 13 are required to scan each label for information. For this purpose, a sensor support 35 is provided on mainshaft 54 opposite each row 25 of labels 12, the sensor supports 35 being moved to desired operating position on shaft 54 through the expediency of releasing locking screws 56 and sliding the sensor supports axially along shaft 54 until the desired position is obtained. As each sensor support 35 is located, the locking screw 56 for that support is turned in to engage shaft 54 and lock the sensor support in position. Keyways 53, 55 cooperate to locate the sensor supports 35 in a common radial position as determined by the current radial position of shaft 54.

The depth D of recess 62 in each of the sensor supports 35 is chosen to provide a predetermined optimum dimension or space between the tensioned label form 14 riding on surface 61 of the support and the sensor 13 carried by the support. As can be understood, depth D remains constant despite adjustment and movement of the sensor support and longterm operation of the labelling machine.

Each label may carry a plurality of control marks 15, i.e. five, thereon, each mark 15 representing a particular operating condition. Sensors 13 are actuated to a ready state by the machine controller (not shown), such sensor actuation being synchronized with the movement of the label form 14 to provide a predetermined window during which the sensor 13 looks for control marks 15. The scan window is in turn subdivided into time increments to permit individual control marks to be distinguished from one another. This permits the individual marks, in addition to being detected, to be identified.

By way of example, during a given scan window, at time T(1), the sensor 13 may look for a first control mark, at time T(2), a second control mark, and so forth and so on. A control mark in the T(1) time frame may for example signal that the label is the first address of a particular group, a control mark in the T(2) time frame may identify the label as the last address of a group, a control mark in the T(3) time frame may identify the label as an address representing a particular class of people such as doctors, and so forth.

Since the width of the labels 12 may vary for different label types and applications, a corresponding variation in the number and position of the control marks may also occur. As a result, sensors 13 may require repositioning along the axis of movement of label form 14 in order to assure proper identification of the individual control marks on the label.

As described above, the scanner assembly 8 of the present invention facilitates adjustment of the sensor 5 position without loss or disturbing other critical adjustments. This is effected through manual turning of the control knob 80 which rotates worm shaft 79 to rotate mainshaft 54 through worm gear 78. Rotation of mainshaft 54 in turn swings or pivots the sensor supports 35 carried by shaft 54 forward or backward through a predetermined arc to the desired angular location to place the sensors 13 in the selected scanning position.

While the invention has been described with reference to the structure disclosed, it is not confined to the details set forth, but is intended to cover such modifications or changes as may come within the scope of the following claims.

We claim:

1. In a labelling machine for processing an endless multi-row label form, said machine including a frame member and label transport means on said frame member for advancing said label form along a predetermined path, the combination of:
  a cross shaft rotatably mounted on said frame member, the axis of said cross shaft being substantially perpendicular to the direction of movement of said label form along said path, said cross shaft being spaced from said label transport means;
  plural label support arms, there being one label support arm for each label row, each of said support arms being enlarged at one end to provide a label guiding surface;
  mounting means for mounting the opposite ends of said support arms on said cross shaft in predetermined spaced axial relation to one another so that said support arms project radially outwardly from said cross shaft with said support arm label guiding surfaces positioned to engage individual ones of said label rows as said label form is advanced along said path by said transport means, said mounting means coupling said plural support arms with said cross shaft for concurrent rotation;
  a sensor on each of said support arms in predetermined spaced relation to the support arm label guiding surface for scanning the labels in the label row engaged by the label guiding surfaces of said support arms as said label form is advanced along said path and across said label guiding surfaces; and
  means to rotate said cross shaft together with said plural support arms in unison to move said sensors along an axis parallel to the direction of advance of said label form by said transport means and adjust the point where said sensors scan the labels in the label row engaged by the label guiding surfaces of said support arms, rotation of said cross shaft moving the label guiding surfaces of said support arms in a predetermined arc about the axis of said cross shaft whereby the point where said sensors scan said labels may be adjusted without changing the gap between the labels and said sensors or the predetermined axial distance between adjoining support arms.

2. The labelling machine according to claim 1 in which the label guiding surface of said label support arms is curved, the radius of curvature of said label guiding surface having a center point coincidental with the axis of said cross shaft.

3. The labelling machine according to claim 2 in which said label guiding surface has a slot-like recess therein, and
  means for supporting said sensor in said recess so that the detecting surface of said sensor is coplanar with the base of said recess;
  the maximum depth of said recess being such as to establish said predetermined spaced relation between said sensor detecting surface and said label guiding surface on mounting of said sensor in said support arm recess.

4. The labelling machine according to claim 2 in which said mounting means supports said support arms for adjusting movement axially along said cross shaft whereby to permit said predetermined spaced axial relation between said support arms to be changed.

5. The labelling maching according to claim 4 including
  means to enable said support arms to be locked against axial movement following adjustment of said support arms to a selected axial position of said cross shaft.

6. The labelling machine according to claim 5 in which said mounting means includes a longitudinally extending keyway on one of said support arms and said cross shaft and a cooperating radially projecting keyway in the other of said cross shaft and said support arms, said keyway and key interengaging with one another to preclude relative rotational movement between said cross shaft and said support arms while permitting said support arms to be moved axially along said cross shaft for adjustment purposes.

7. The labelling machine according to claim 2 in which said cross shaft rotating means includes
  a first gear secured to said cross shaft; and
  a second drive gear in meshing engagement with said first gear, rotation of said second drive gear rotating said first gear to rotate said cross shaft and move said support arms to adjust the position of said sensors.

* * * * *